United States Patent
Grumann

(10) Patent No.: US 7,607,135 B2
(45) Date of Patent: Oct. 20, 2009

(54) APPARATUS AND METHOD FOR ENHANCING PERFORMANCE OF A COMPUTER SYSTEM

(75) Inventor: Doug Grumann, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 09/882,845

(22) Filed: Jun. 15, 2001

(65) Prior Publication Data
US 2003/0005024 A1  Jan. 2, 2003

(51) Int. Cl.
G06F 3/00 (2006.01)
G06F 9/44 (2006.01)
G06F 9/45 (2006.01)
G06F 19/00 (2006.01)

(52) U.S. Cl. .......... 719/310; 717/127; 717/151; 700/108

(58) Field of Classification Search .......... 709/318; 719/318, 310; 700/108, 32; 702/182; 717/127, 717/151
See application file for complete search history.

(56) References Cited

U.S. PATENT DOCUMENTS

| | | | | |
|---|---|---|---|---|
| 4,779,208 A | * | 10/1988 | Tsuruta et al. | 706/57 |
| 5,446,653 A | * | 8/1995 | Miller et al. | 705/4 |
| 5,586,052 A | * | 12/1996 | Iannuzzi et al. | 703/1 |
| 5,729,472 A | * | 3/1998 | Seiffert et al. | 702/188 |
| 6,059,842 A | * | 5/2000 | Dumarot et al. | 717/153 |
| 6,144,954 A | * | 11/2000 | Li | 706/62 |
| 6,243,614 B1 | * | 6/2001 | Anderson | 700/108 |
| 6,325,178 B2 | * | 12/2001 | Hikita et al. | 187/382 |
| 6,342,985 B1 | * | 1/2002 | Clare et al. | 360/75 |
| 6,505,249 B1 | * | 1/2003 | Rehkopf | 709/224 |

OTHER PUBLICATIONS

Mihata, Design rule verifyring system, Jun. 8, 1989.*
Mihata, Design rule vefifying system, Jun. 8, 1989.*
U.S. Appl. No. 09/773,120, filed Jan. 31, 2001, for "Historical Results Based Method for Automatically Improving Computer System Performance" by Thomas E. Turicchi, Jr., et al.

* cited by examiner

Primary Examiner—Lechi Truong

(57) ABSTRACT

Apparatus and method for enhancing performance of a computer system. The invention may comprise apparatus and methods for deriving relationships between system variables and the performance of the computer system, generating a number of rules based on the derived relationships, and adjusting at least one of the system variables based on the generated number of rules to enhance the performance of the computer system. Preferably, data is acquired for the system variables and the performance of said computer system by gathering the data over time, and logging the gathered data, wherein the relationships are derived based on the logged data.

6 Claims, 7 Drawing Sheets

APPARATUS AND METHOD FOR ENHANCING PERFORMANCE OF A COMPUTER SYSTEM

FIELD OF THE INVENTION

The invention generally pertains to enhancing the performance of a computer system and more particularly to adjusting system variables based on a number of rules to enhance the performance of the computer system.

BACKGROUND OF THE INVENTION

A variety of variables, and any changes thereto, affect the performance of individual and networked computer systems, including the various resources of each (e.g., the operating system, hardware, software applications, etc.). For example, a server may have multiple processors that can be allocated to different software applications according to prioritization of the workload. Or, for example, an operating system may be configured with larger or smaller disk caching buffers to efficiently balance various demands on memory allocation. Other examples may include system kernel parameters, disk bandwidth, process scheduling, application-specific parameters, etc.

Instrumentation exists that measures these variables and/or the performance of the computer system or various resources thereof. For example, instrumentation may measure the utilization of various resources (e.g., the central processing unit (CPU), memory, etc.), throughput, application health, response time, etc. This instrumentation is used by performance tools, and, albeit less often, by application software, to monitor the characteristics of the workload and the health of the services enabled by the applications running on the computer system. For example, the Application Response Measurement (ARM) standard may be used to instrument services to provide response time and throughput. An example of application-specific information may be the statistics on cache efficiency internal to a specific database. In addition, probes may simulate or generate service requests on a system, which may be measured to provide performance data. For example, Hewlett-Packard Company's (corporate headquarters, Palo Alto, Calif.) Vantage Point Internet Services makes use of such probes. However, the relationship between the system variables and the performance of the computer system is often indirect and non-deterministic.

In general, such performance tools are oriented towards obtaining performance metrics from the various instrumentation for display and report generation. Often these performance tools do not recommend any changes to the variables affecting the performance of the computer system. The system administrator must interpret these results to determine which variables, if any, can be reconfigured. For example, the performance tool may indicate to the administrator that the response time of a service has slowed beyond an acceptable threshold. In response, the administrator (or automated load balancer) may make changes to the CPU scheduling policy to favor the application providing the service.

Where these performance tools do make recommendations, the recommendations are generated from simple thresholds (e.g., provisioning a specific resource in response to a specific event). Even so, these recommendations are only based on current behavior, and are not based on a historical analysis. Other factors, and often more than one resource, may account for the slower response time. For example, the application may be accessing a storage device that is bottlenecked (i.e., at capacity with a large queue) because of paging activity by the operating system which may, in turn, have been caused by a bottleneck on physical memory allocation caused by another application allocating excessive memory. As such, changing the application CPU processing priority will not improve the response time of the service. Instead, changes to memory (partitioning) or storage (moving paging areas away from application data paths) are required to speed up response time.

Some workload management and load balancing tools, such as Hewlett-Packard's Workload Manager and WebQOS, are capable of adjusting system variables based on performance monitors. However the changes are coarse (single system resource level configuration such as processor allocation). Furthermore, the changes are not based on trends in historical data, and do not consider the affect of previous changes to these variables.

SUMMARY OF THE INVENTION

The inventor has devised an apparatus and method for enhancing the performance of a computer system. The invention uses a number of rules that are based on the relationship between system variables and the system performance to enhance the performance of the computer system.

The apparatus is preferably embodied in computer readable program code stored on computer readable storage media. The apparatus may comprise program code for deriving relationships between system variables and the performance of the computer system. Also preferably, the apparatus may comprise program code for generating a number of rules based on the derived relationships. An exemplary rule may take the form: "IF PerfMetricX Increases, THEN Decrease SysVarY Proportionally". More complex rules may also be generated based on a combination of direct and indirect correlations. For example, rules may be based on data gathered over time or historical data, performance goals or benchmark results, etc.

In addition, the apparatus preferably comprises program code for adjusting at least one of the system variables based on the generated number of rules to enhance the performance of the computer system. For example, the adjustment may be to activate an additional processor for use by the server, or to change scheduling priorities, modify system parameters, etc.

The apparatus may also comprise program code for acquiring data for the system variables and the performance of the computer system. The program code for acquiring data may comprise: program code for gathering the data over time; and program code for logging the gathered data, wherein the program code for deriving relationships derives the relationships based on the logged data.

Program code may also be provided for iteratively deriving relationships between the system variables and the performance of the computer system, and iteratively generating a number of rules based on the derived relationships when an adjustment is made to at least one of the system variables.

A method for enhancing the performance of the computer system is also disclosed. An embodiment of the method may comprise deriving relationships between system variables and the performance of the computer system; generating a number of rules based on the derived relationships; and adjusting at least one of the system variables based on the generated number of rules to enhance the performance of the computer system. In addition, the method may comprise acquiring data for the system variables and the performance of the computer system, wherein the acquired data is used for deriving the relationships. Acquiring data may comprise:

gathering the data over time; and logging the gathered data, wherein the relationships are derived based on the logged data.

The invention may automatically monitor both the system variables and the performance of the computer system and determine adjustment(s) to the system variables to enhance the performance of the computer system. That is, the performance and corresponding configuration may be monitored to recognize the significance and impact of events affecting the computer system so that performance-enhancing adjustments can be made thereto. Preferably, multiple system variables and system performance metrics are analyzed according to the teachings of the invention, and complex relationships therebetween are distilled into a number of rules.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
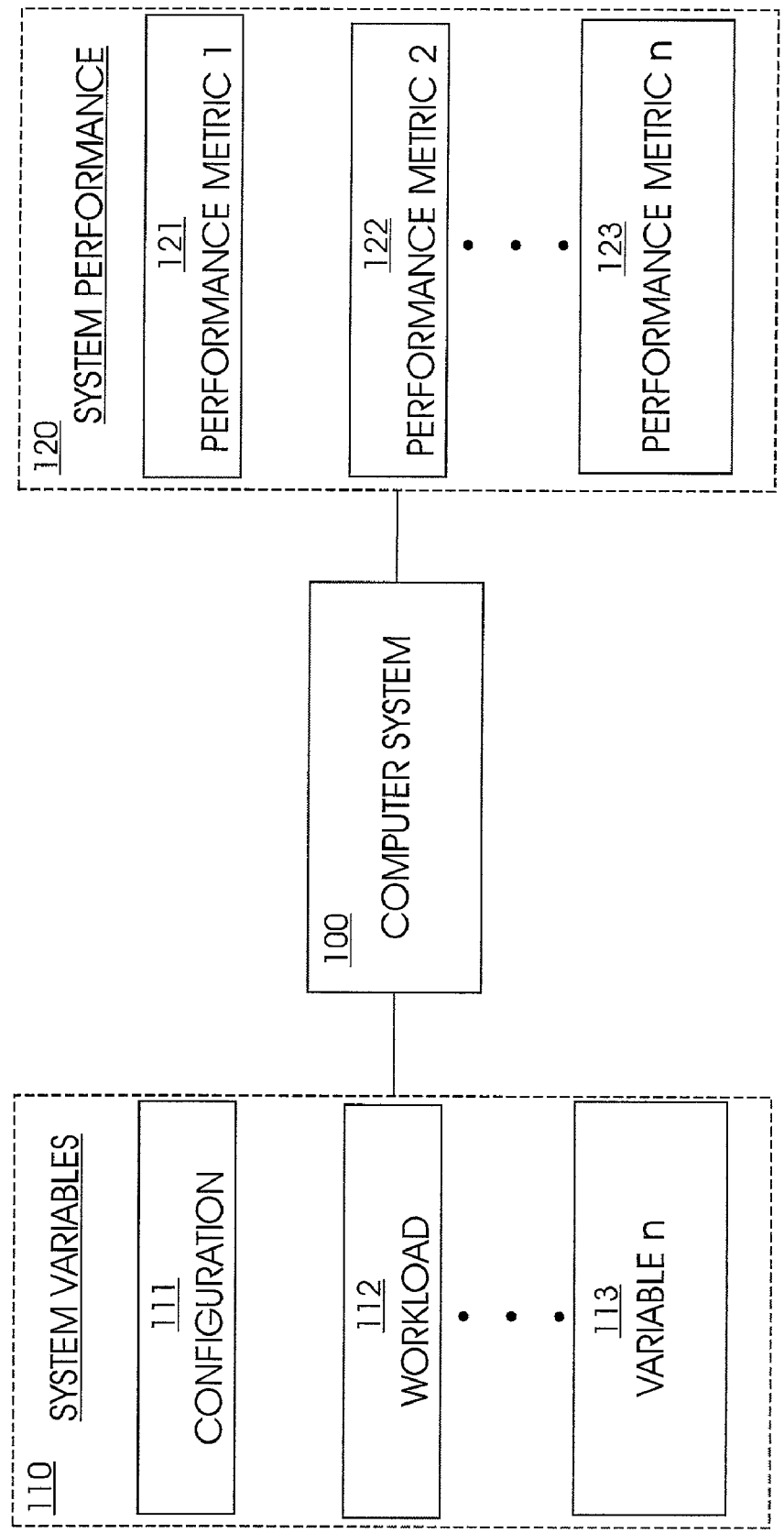
FIG. 1 is a high level diagram illustrating system variables that affect the performance of a computer system.

FIG. 1 is a high-level view of a computer system 100 showing system variables 110 that affect performance of the computer system 100. The system variables 110 may be derived from, for example, configuration 111, workload 112, and any number of other variables 113. The system performance 120 may be determined based on a number of performance metrics 121-123. The invention enhances the performance of the computer system 100, generally, by deriving relationships between the system variables 110 and the system performance 120, generating a number of (i.e., one or more) rules 500-502 (FIG. 5) based thereon, and adjusting at least one of the system variables 110 based on one or more of the rules 500-502.

Exemplary system variables 110 may include the status of the system resources (e.g., the number of active CPUs), system parameter values (e.g., the amount of physical memory allocated to disk caching), application-specific parameters (e.g. the size of database table structures), etc. It is understood that the system variables 110 include any variables that may affect the performance of the computer system 100 and is not limited to kernel tunables. For example, system variables 110 may also include a particular database schema indexing policy configuration parameter, or any other suitable variable. Exemplary performance metrics 120 may be measured in terms of service health, application response time, throughput, etc. Preferably, the performance metrics 120 are readily interpreted to have definable performance goals. The relationships may be derived based on an analysis of part or all of the above data and/or other data.

It is understood that, as used herein, the language "a number of" is intended to include "one or more". It is also understood that the computer system 100 may include any suitable components, such as, but not limited to, a processor (e.g., an Intel PENTIUM® processor), a storage device or suitable computer readable storage medium (e.g., a hard disk drive, magnetic tape, zip drive, compact disc (CD), Read Only Memory (ROM), Random Access Memory (RAM), etc.), and other resources (e.g., keyboard, mouse, display, etc.), now available or later developed. In addition, the computer system 100 may comprise a network (e.g., a local area network (LAN), a wide area network (WAN)) and the resources thereof, an individual computer (e.g., a personal computer (PC), workstation, etc.), and/or one or more individual resources.

Figure 2:
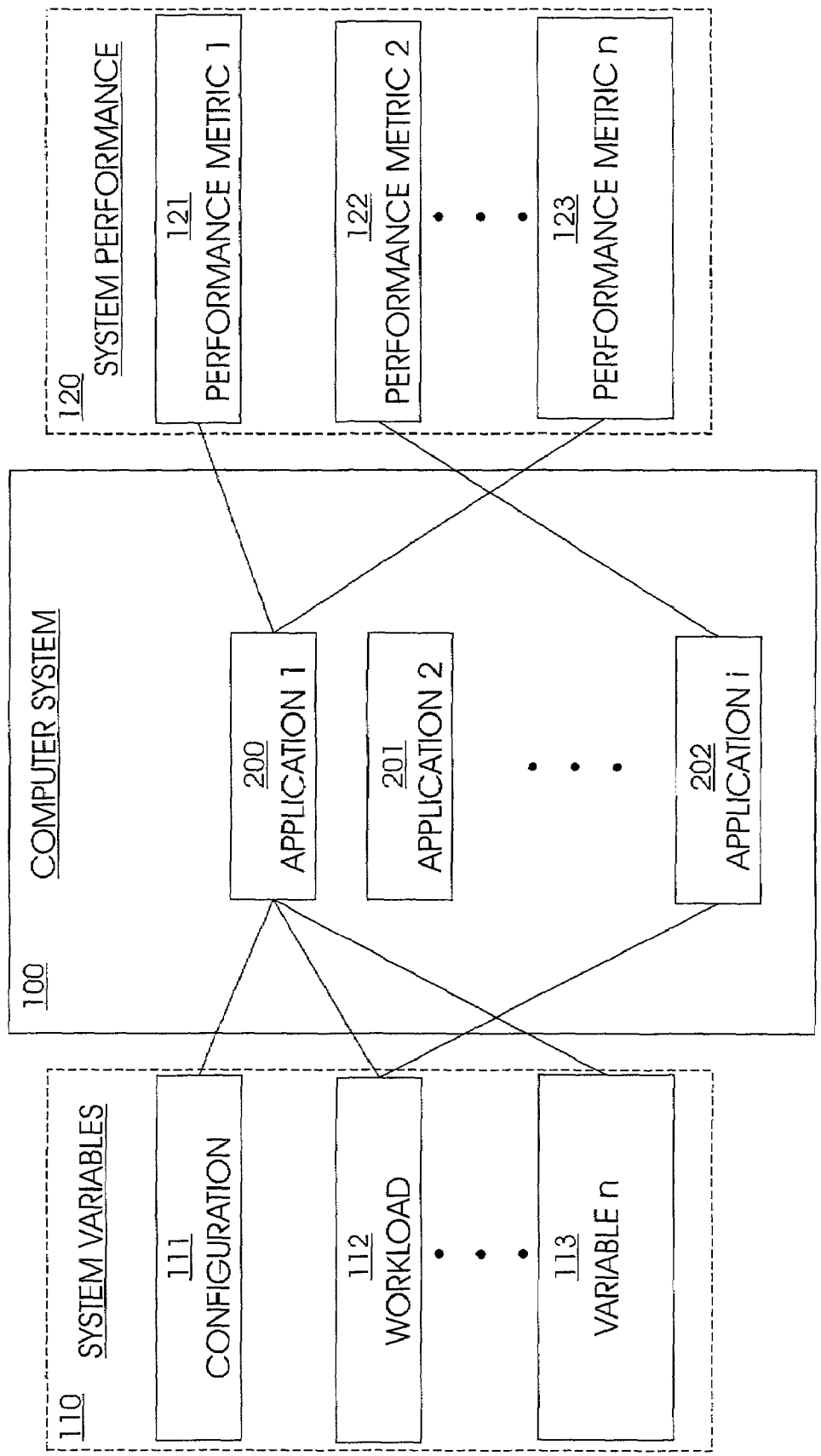
FIG. 2 is a high-level diagram illustrating the system variables for various applications of the computer system that affect the performance thereof.
Figure 3:
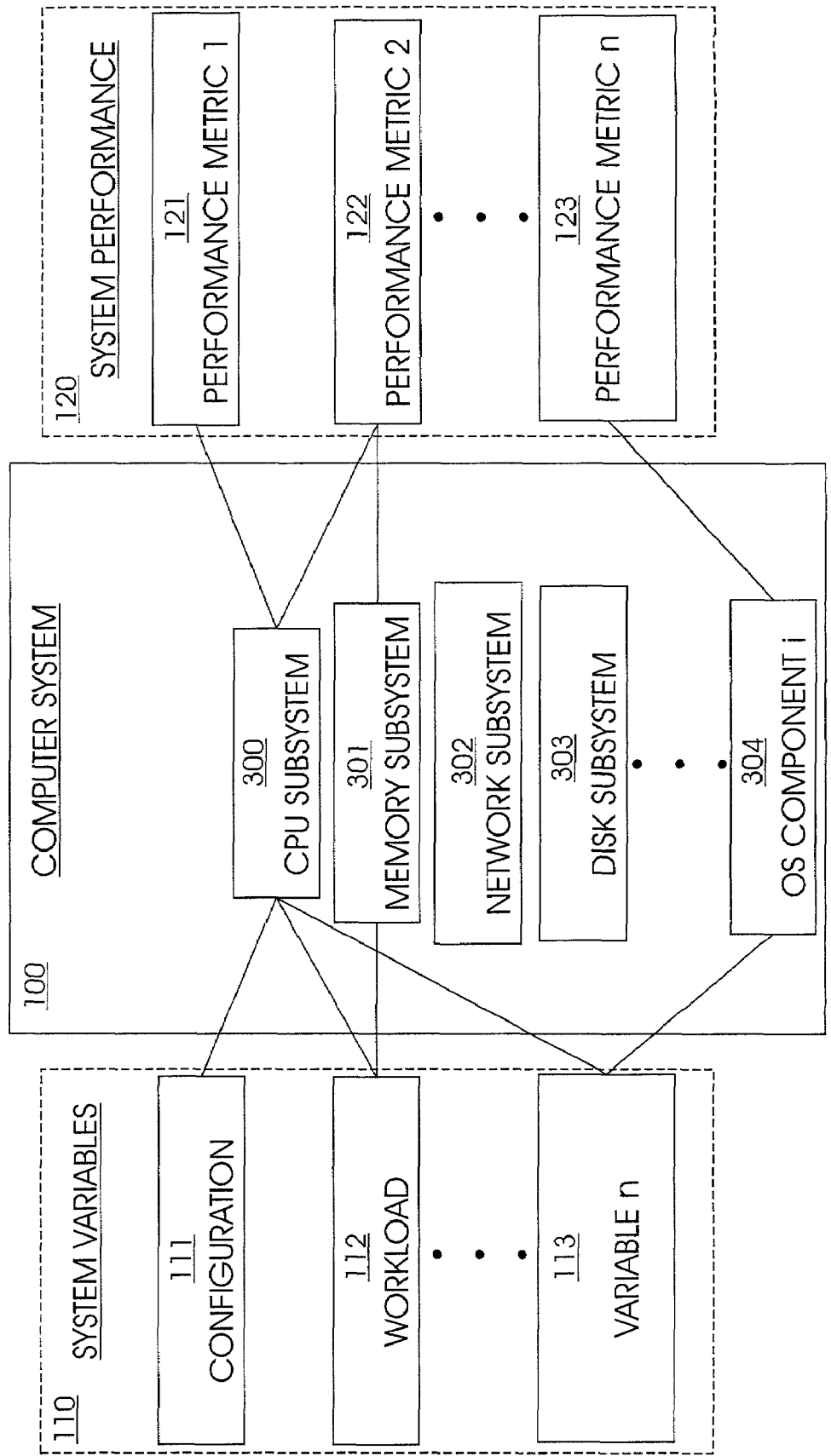
FIG. 3 is a high-level diagram illustrating the system variables for a subsystem of the computer system that affect the performance thereof.

FIG. 2 is another high-level diagram illustrating the system variables 110 for a number of applications 200-202 residing on the computer system 100 that affect the system performance 120. For example, the system variables 110 may be the configuration, number of users, etc., of one or more of the applications 200-202. Likewise, the system performance 120 may be the response time of one or more of the applications 200-202. FIG. 3 is another high-level diagram illustrating the system variables 110 for a number of subsystems 300-304 of the computer system 100 that affect the system performance 120. For example, the system variables 110 may be the configuration of, and/or workload on, the CPU subsystem 300, the memory subsystem 301, the network subsystem 302, the disk subsystem 303, an operating system component 304, etc. Likewise, the system performance 120 may include performance metrics 121-123 for one or more of the subsystems 300-304.

It is understood that in FIG. 2 and FIG. 3, there may be other system variables 110 other than those shown, corresponding to one or more of the other applications 200-202 and/or subsystems 300-304. In addition, data for the system variables 110 and the system performance need not be on a one-to-one corresponding basis. For example, the workload 112 on the CPU subsystem 300 and on the memory subsystem 301 may affect performance metrics 121 and 122. Or for example, the data for the configuration 111 of the disk subsystem (303) and the response time (e.g., performance metric 121) for Application 1 (200) may be acquired for analysis of the relationship therebetween. In addition, the illustrated system variables 110 may also correspond to additional applications 200-202 and/or subsystems 300-304, not shown. Indeed, the computer system 100 may comprise any number of applications 200-202, subsystem components 300-304, and/or other resources (not shown).

Suitable program code may be provided for identifying the applications 200-202 and/or subsystem components 300-304, etc., on the computer system 100, and any system variables 110 that may affect the performance of the computer system 100. Preferably the computer system 100 is monitored (e.g., using suitable program code) and data is acquired for a combination of system variables 110 and system performance 120 according to the teachings of the invention. As such, the rules for enhancing the performance of the computer system 100 is based on a comprehensive set of parameters.

It is understood that the data for the system variables 110 and the system performance 120 may be acquired by any suitable data acquisition component(s) (e.g., devices and/or program code). Likewise, program code may be provided for gathering additional data, such as acceptable range(s) for one or more of the system variables 110, performance goals for the system performance 120, etc. The program code may automatically monitor and obtain the data (e.g., from instrumentation points), the data may be manually specified (e.g., via a user interface), or the data may be acquired through a combination thereof. For example, a user or administrator may specify a desired response time (i.e., a performance goal) for an application 200.

The data acquisition component may be incorporated into the computer readable program code of the invention. Alternatively, the data acquisition component may be a separate software and/or hardware component and need not necessarily be integrated as part of the computer readable program code of the invention. For example, instrumentation points residing within the computer system 100 may feed the data acquisition component of the invention with the data for the system variables 110 and the system performance 120. The instrumentation points may be associated with applications (e.g., 200-202 in FIG. 2), a subsystem (e.g., 300-304 in FIG. 3), and/or other components with the computer system 100.

The data acquisition component may gather the data from various instrumentation points, directly from configuration files, a combination thereof, etc. The gathered data is preferably logged in one or more computer readable files. Examples of the data contained in such computer readable files may be as follows:

System Variables (110) at discrete point in time T1
Application Parameter XYZ=35
Application Buffer Size=2345 kB
Application Instance Count=3
Application Parameter JKL=104
. . .
Active Processor Count=4
Physical Memory Size=2 GB
Network Daemon Count=8
Disk Raid Value=5
Buffer Cache Maximum=1024 MB
. . .
System Performance (120) at discrete point in time T1
App1 Response Time=1.3 sec
App1 Throughput=12 per sec
App2 Response Time=0.05 sec
. . .
Average Service Time=0.13 sec
User Count=207
. . .

It is understood that the data for the system variables 110 and the system performance 120 may be acquired simultaneously, or separately. For example, the data for the system performance 120 may be acquired in response to a change in one or more of the system variables 110, or vice versa. Likewise, acquiring the data for the system variables 110 may be continuous or dynamic, at predetermined intervals, when an event is detected (i.e., declining response time), over time as a historical comparison, averaged, etc.

In addition, the data for the system variables 110 and the system performance 120 may be acquired using a network-centric approach, a system-centric approach, or a combination thereof. A network-centric approach may include acquiring data for the system variables 110 and system performance 120 of various resources on a network (e.g., routers, servers, server components, etc.). A system-centric approach may include acquiring the data for the system variables 110 and system performance 120 of the resources of an individual computer (e.g., a hard disk drive, a display device, etc.).

Figure 4:
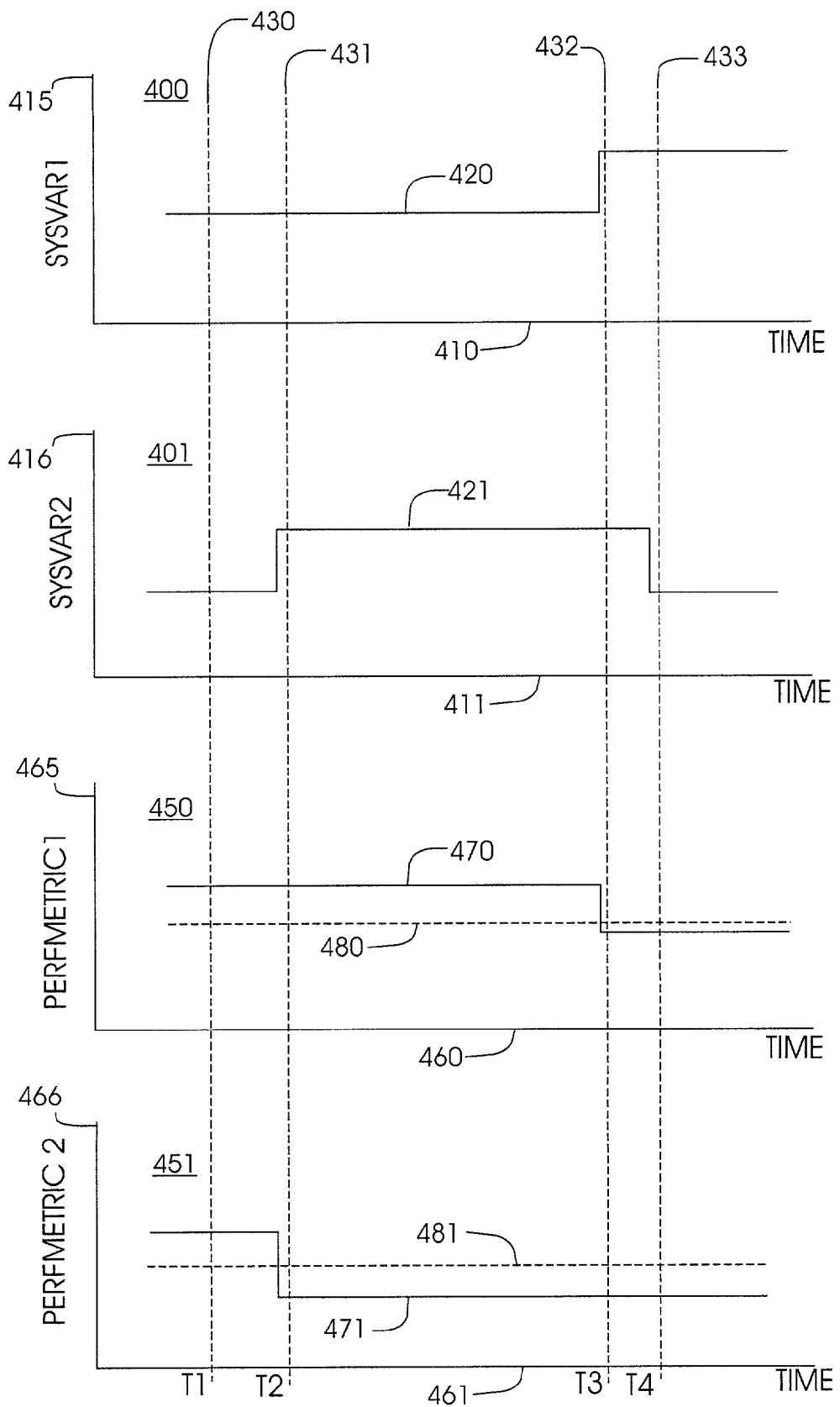
FIG. 4 is a series of plots illustrating relationships between the system variables and the performance of the computer system.

FIG. 4 is a series of plots 400, 401 and 450, 451 of historical data 420, 421, and 470, 471 illustrating the relationships between the system variables 110 and the system performance 120 that may be logged according to the teachings of the invention. The system variables 110 are shown on the y-axis 415 and 416 of plots 400 and 401 as a function of time along the x-axis 410, 411. The system performance 120 is shown on the y-axis 465 and 466 of plots 450 and 451, respectively, as a function of time along the x-axis 460, 461. Performance goals 480 and 481 are shown for the performance (465, 466) plots. For illustration, these may be considered thresholds which it is desirable to keep the value of the performance metrics at or below. An example of this would be for response-time goals (service level would be indicated by average response time at or below a threshold). The logged data shown in FIG. 4 illustrates the effect various adjustments to one or more of the system variables 110 has on the system performance 120 (i.e., one or more performance metrics 121, 122, 123). For example, between time T1 (430) and time T2 (431), SysVar1 (415) remained constant and SysVar2 (416) increased, resulting in no change to PerfMetric1 (465) and a decrease in PerfMetric2 (466). Also for example, between time T2 (431) and time T3 (432), SysVar1 (415) increased and SysVar2 (416) remained constant, resulting in a decrease in PerfMetric1 (465) and no change to PerfMetric2 (466). Also for example, between time T3 (432) and time T4 (433), SysVar1 (415) remained constant and SysVar2 (416) decreased, resulting in no change to both PerfMetric1 (465) and PerfMetric2 (466). In addition, the historical data shown in FIG. 4 illustrates that PerfMetric1 (465) moved under the performance goal 480 at time T3 (432) and time T4 (433), and that PerfMetric2 (466) achieved the performance goal 481 by time T2 (431) shown in FIG. 4.

Another, more detailed illustration, is described below with respect to the data illustrated in the following Tables 1-3. Two system variables 110 are defined in Table 1 for this example.

TABLE 1

| System Variable (110) | Definition | Range |
| --- | --- | --- |
| SysVar1 | Buffer Cache Size | 10 MB to 500 MB |
| SysVar2 | Database Table Size | 1000 MB to 10000 MB |

SysVar1 is defined as the buffer cache size (e.g., for the memory subsystem 301 in FIG. 3). SysVar1 has a range from 10 MB to 500 MB. SysVar2 is defined as the database table size (e.g., for an application 200-202 on the computer system 100 in FIG. 2). SysVar2 has a range from 1000 MB to 10000 MB. The range indicates the lower and/or upper limit in which the system variable 110 may be adjusted. Preferably, a recommended adjustment, discussed in more detail below, is within this range.

Two performance metrics 120 are defined in Table 2 for this example.

TABLE 2

| Performance Metric (120) | Definition | Goal |
| --- | --- | --- |
| PerfMetric1 | Response Time For Application 1 | <1 second |
| PerfMetric2 | Response Time For Application 2 | <4 seconds |

PerfMetric1 is defined as the response time for Application 1 (e.g., an application 200-202 in FIG. 2). PerfMetric2 is defined as the response time for Application 2 (e.g., also an application 200-202 in FIG. 2). These performance metrics 120 also have corresponding performance goals of <1 second and <4 seconds, respectively. That is, under ideal operating conditions, Application 1 has a response time of less than 1 second, and Application 2 has a response time of less than 4 seconds. The performance goals may be user-defined, defined based on test data, defined by the developer, etc. Although the performance goal may not be achieved under normal operating conditions, the performance of the computer system 100 is enhanced by tending toward the performance goal.

Exemplary data acquired for each of the system variables 110 and performance metrics 120 is provided in Table 3 at seven separate times, T1-T7.

TABLE 3

| Time | SysVar1 | SysVar2 | PerfMetric1 | PerfMetric2 |
|------|---------|---------|-------------|-------------|
| T1 | 100 | 1000 | 5.1 | 6.7 |
| T2 | 200 | 1000 | 3.2 | 5.3 |
| T3 | 500 | 1000 | 0.2 | 4.9 |
| T4 | 500 | 2000 | 0.6 | 4.3 |
| T5 | 500 | 4000 | 1.7 | 3.1 |
| T6 | 500 | 8000 | 3.4 | 2.7 |
| T7 | 500 | 10000 | 7.7 | 1.9 |

Preferably, the data is acquired by gathering the same over time and logging the gathered data, for example, in one or more files, such as described above. As such, the derivation of relationships between the system variables 110 and the system performance 120 may be based on a historical analysis.

In one embodiment, the analysis may be based on point-in-time data. That is, the analysis may be a comparison of the data for the performance metrics 121-123 with the performance goals at given times. Where the performance goals are nearest to being satisfied, the data for the system variables 110 at that point-in-time may be used to generate one or more rules 500-502. For example, at times T3 and T4, PerfMetric1 is nearest the performance goal of <1 second, and at times T5, T6, and T7, PerfMetric2 is nearest the performance goal of <4 seconds. Although there is no overlap where both the performance goal of PerfMetric1 and PerfMetric2 are both being satisfied, at time T4, the performance goal of PerfMetric1 is satisfied and the performance goal of PerfMetric2 is nearly satisfied (i.e., 4.3 seconds). Thus, a rule 500-502 may be based on the corresponding values of the system variables 110 at time T4.

Other embodiments may include acquiring additional data for further analysis, or modeling performance based on the already acquired data. For example, between times T4 and T5, SysVar2 was adjusted from 2000 MB to 4000 MB, and PerfMetric2 changed from 4.3 seconds (exceeding the performance goal) to 3.1 seconds (meeting the performance goal). The value of PerfMetric2 remained below the goal threshold as SysVar2 was increased further. Similarly, PerfMetric1's value was within the goal range at times T3 and T4, moving out of its performance goal range between T4 and T5. Therefore, additional data and/or modeling the existing data may indicate that holding SysVar1 to 500 MB and setting SysVar2 to a value between 2000 MB and 4000 MB (e.g., 3000 MB) and may bring both metrics of interest into compliance with the respective goals of each.

Preferably, the analysis is based on a combination of one or more various analysis. As such, the derivation of relationships between the system variables 110 and the system performance 120 is extensive, and hence extensive rules 500-502 may be generated for enhancing the performance of the computer system 100.

An exemplary analysis, wherein the relationships between the system variables 110 and the system performance 120 are derived, may be as follows, based on the acquired data shown in the above Tables 1-3. When SysVar1 is increased and SysVar2 is held constant at 1000 MB, both PerfMetric1 and PerfMetric2 improve (i.e., tend toward the respective performance goals). When SysVar2 is then increased while SysVar1 is held constant, PerfMetric1 deteriorates (i.e., tends away from the performance goal) while PerfMetric2 continues to improve. The relationships derived from this data would hold PerfMetric1 as strongly inversely proportional to values of SysVar1 and less strongly proportional to values of SysVar2. PerfMetric2 is inversely proportional to both SysVar1 and SysVar2.

It is understood that suitable program code may be provided for analyzing the acquired data and deriving the relationships between the system variables 110 and the system performance 120, such as those discussed above. Likewise, program code may also be provided for plotting, performing statistical, historical, or any other suitable analysis of the data. In addition, any statistical, historical, plot or graphical representation, or other analysis, including those with user input variables, may be used according to the teachings of the invention.

It is also understood that the examples discussed above with respect to FIG. 4 and Tables 1-3 are separate examples and are not intended to correspond with one another. In addition, the data shown in FIG. 4 and the data shown in Tables 1-3 is merely illustrative of data that may be obtained and analyzed according to the teachings of the invention. The examples given above with respect to FIG. 4 and Tables 1-3 are not intended to limit the teachings of the invention. Furthermore, the data of FIG. 4 and Tables 1-3 is not to be construed as actual data for any particular computer system 100, and was not measured as such.

Figure 5:
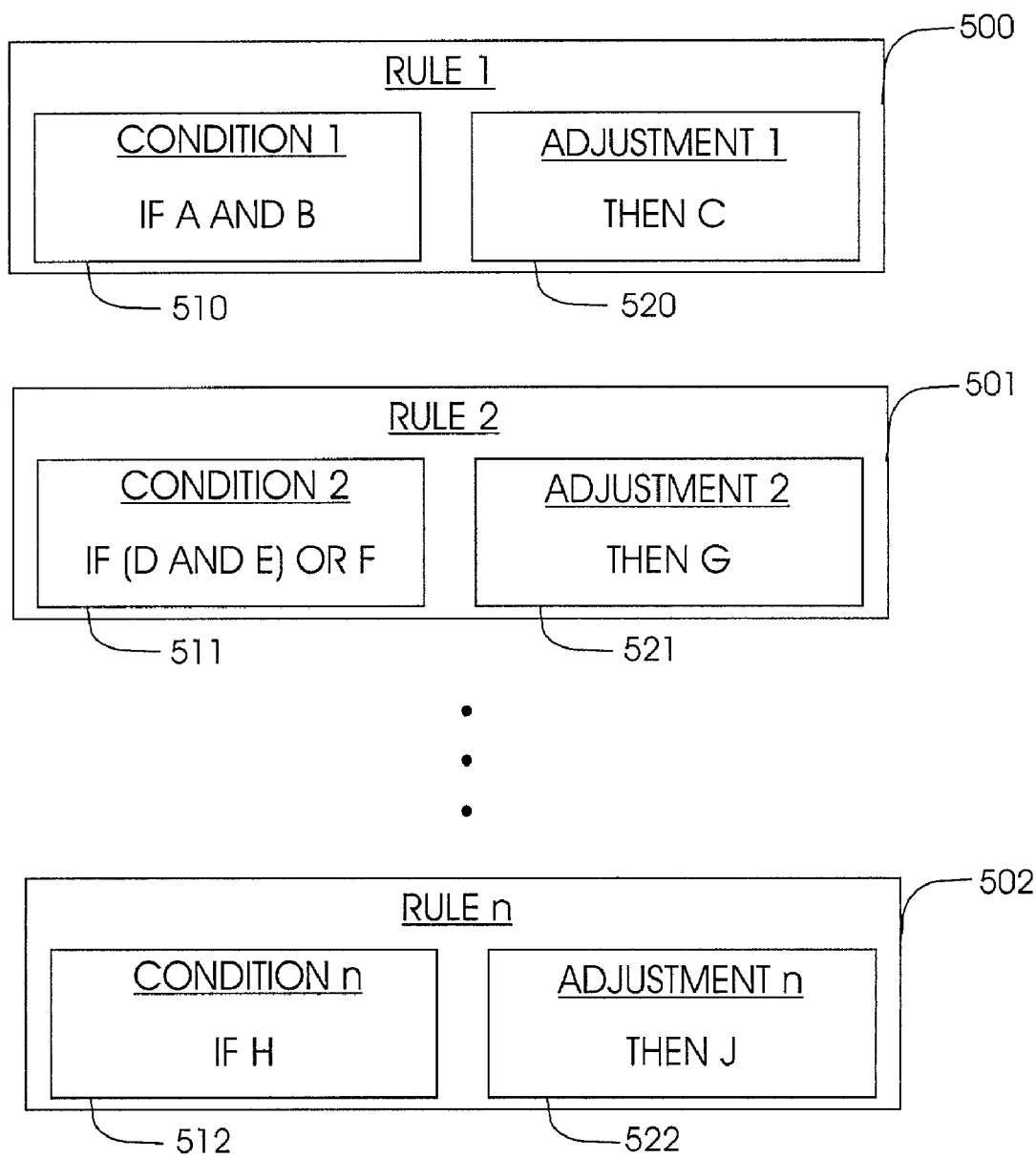
FIG. 5 illustrates a number of rules for optimizing the performance of the computer system.

A number of rules 500-502 may be generated based on the analysis of the acquired data for the system variables 110 and the system performance 120, and the derived relationships therebetween, such as those illustrated above. FIG. 5 illustrates a number of rules 500-502 for enhancing the performance of the computer system 100. The rules 500-502 may be stored in a computer readable format (e.g., a database), and may comprise conditions 510-512 and corresponding recommended adjustments 520-522. Hence, when the condition 510 is met, one or more of the system variables 110 may be adjusted based on the corresponding recommended adjustment 520 in the rule 500 to enhance the performance of the computer system 100.

As an example, based on the acquired data in Tables 1-3, the first system variable 110 has a range from 10 MB to 500 MB, and the second system variable 110 has a range from 1000 MB to 10000 MB. Therefore, any rules 500 must be within the respective ranges. The analysis of the historical data indicates that when SysVar1 is 500 MB, both PerfMetric1 and PerfMetric2 tend toward the respective performance goals when SysVar2 is between 2000 MB and 4000 MB. Therefore, exemplary rules 500-502, may comprise:

IF SysVar1< >500 MB,
THEN Set SysVar1=500 MB.
IF (SysVar2<2000 MB or SysVar2>4000 MB),
THEN Set SysVar2=3000 MB.

Other exemplary rules based on the analysis of the data in Tables 1-3 may include the following:

IF PerfMetric1>Goal1 (1),
THEN Increase SysVar1 by Increment (50) limit Max1 (500)

AND Decrease SysVar2 by Increment (100) limit Min2 (1000).
IF PerfMetric2>Goal2 (4),
THEN Increase SysVar1 by Increment (50) limit Max1 (500)
AND Increase SysVar2 by Increment (100) limit Max2 (10000).

It is understood that the rules 500-502 described above and shown in FIG. 5 are merely illustrative of the invention. The rules 500-502 may be more complex and/or take other forms than those shown. For example, any number of rules 500-502 may be generated based on any number of system variables 110 and performance metrics 121-123 for the computer system 100. Preferably, generic relationships are derived based on the analysis of the acquired data. For example, a generic relationship may be:
IF PerfMetricA increases,
THEN decrease SysVarB proportionally.

Such generic relationships may be readily derived based on more extensive data that may be acquired.

In addition, the rules 500-502 may also include adjustments for an identified resource when a condition is no longer being met. For example, the rules 500-502 may include reducing the cache buffer size when the workload 112 drops below a predetermined threshold. As such, resources may be conserved, power consumption and operating costs may be reduced, etc.

Figure 6:
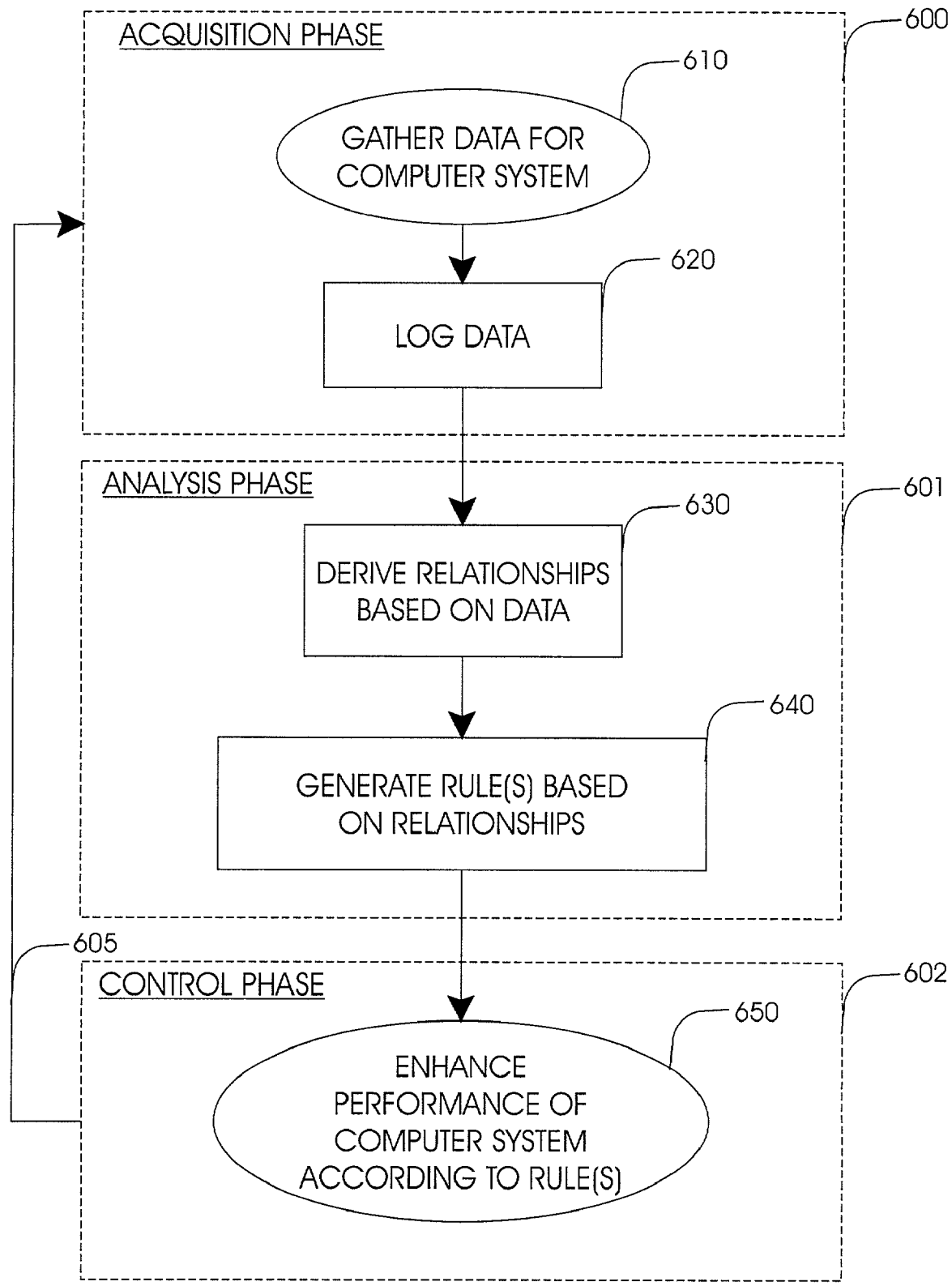
FIG. 6 is a flow chart illustrating an embodiment of a method of the invention.

FIG. 6 is a flowchart showing steps of one embodiment of a method of the invention. Generally, an embodiment of the method of the invention comprises an acquisition phase 600, an analysis phase 601, and a control phase 602. More specifically, the acquisition phase 600 may comprise the steps of gathering data for the computer system 100 over time in step 610, and logging the data in step 620. The acquisition phase 600 may also comprise obtaining the existence of one or more system variables 110, the range(s) for system variables 110, performance goal(s), etc. Data gathering may be by directly measuring various parameters of one or more resources using suitable program code, obtaining the data from suitable instrumentation, or a combination thereof. The analysis phase 601 may comprise deriving relationships between the system variables 110 and the system performance 120, in step 630, based on the data acquired in the acquisition phase 600. In addition, the analysis phase 601 may comprise generating a number of rules 500-502 in step 640 based on the relationships derived in step 630. The rules 500-502 may specify at least one adjustment 520-522 to be made to the computer system 100 when a condition 510-512 is met or approached. The adjustment is made during the control phase 602, wherein the performance of the computer system 100 is optimized according to the rules in step 650.

The adjustment is preferably implemented by notifying an administrator of the adjustment 520-522 in the rule 500-502. The administrator may manually make the adjustment to the computer system 100. Alternatively, the administrator may grant approval for automatic adjustment of the system variable 110 in accordance with the rule 500-502. Alternatively, the adjustment may be made automatically. In yet another embodiment, the adjustment can be made automatically and the administrator can also be notified of the adjustment that has been made. As such, the administrator can accept the adjustment, override the adjustment, reconfigure the computer system 100, review the adjustment for record-keeping purposes, etc.

Preferably, the method is iterative or recursive (e.g., 605). That is, once one or more of the system variables 110 has been adjusted according to one or more of the rules 500-502 in the control phase 602, the invention comprises returning to the acquisition phase 600. As such, additional data for the system variables 110 and the system performance 120 may be acquired for analysis in phase 601, to further enhance the performance of the computer system 100 during the control phase 602. However, it is understood that the phases 600-602 need not be carried out in distinct blocks of time, and indeed, one or more phases 600-602 may continue simultaneously with one another.

Figure 7:
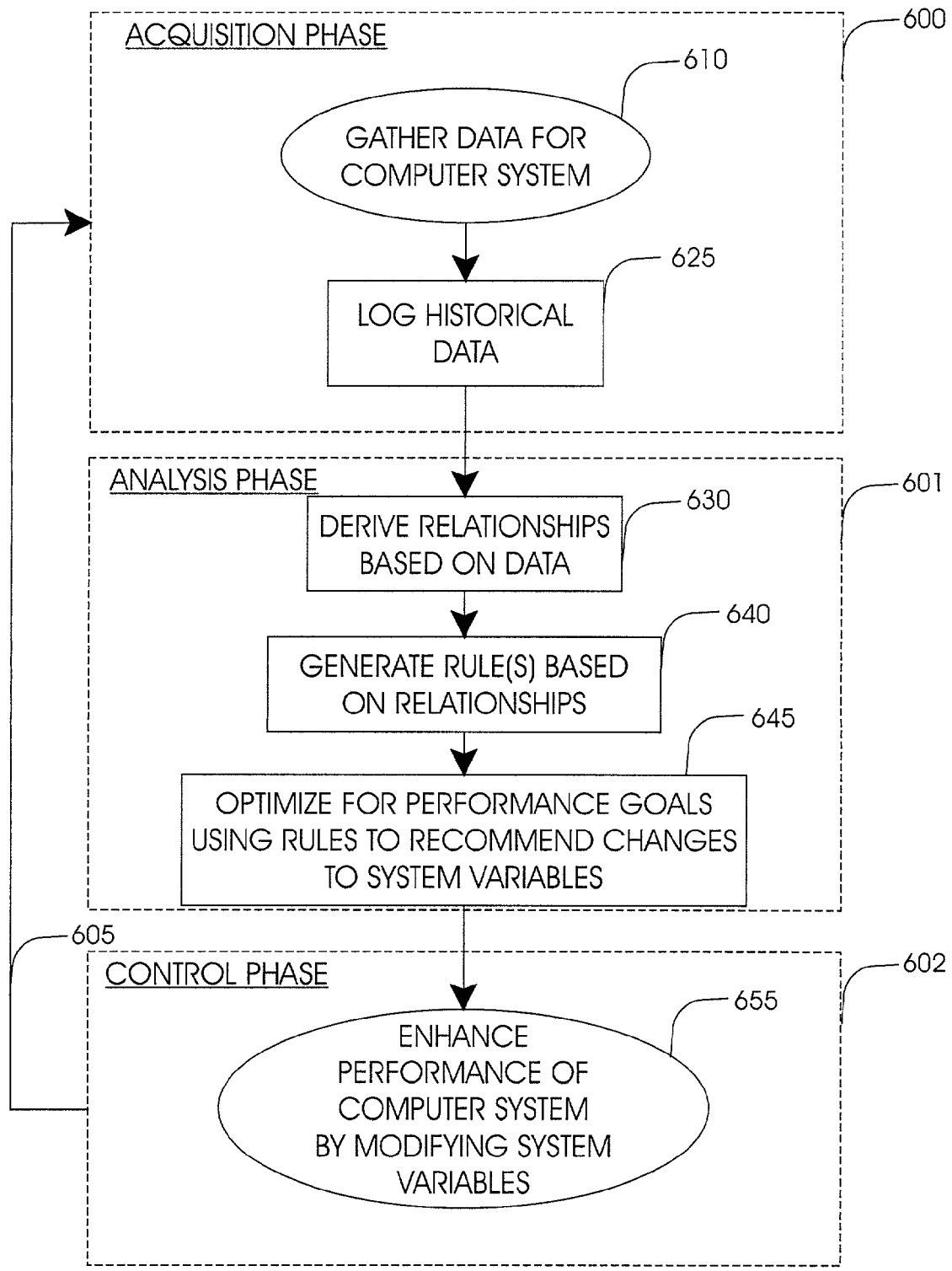
FIG. 7 is a flow chart illustrating another embodiment of a method of the invention.

FIG. 7 is a flowchart showing steps of another embodiment of a method of the invention. Again, generally the method of the invention comprises an acquisition phase 600, an analysis phase 601, and a control phase 602. More specifically, the acquisition phase 600 may comprise the steps of gathering data for the computer system 100 over time in step 610, and logging historical data in step 625. The analysis phase 601 may comprise deriving relationships between the system variables 110 and the system performance 120, in step 630, based on the data acquired in the acquisition phase 600. In addition, the analysis phase 601 may comprise generating a number of rules 500-502 in step 640 based on the relationships derived in step 630. Also according to this embodiment, the rules 500-502 may be optimized for the various performance goals in combination with current values of the system variables 110 and used to recommend incremental changes to the system variables 110 in step 645. The system variables are adjusted or modified according to the rules to improve or enhance performance of the computer system 100 during the control phase 602 in step 655. Again, the method may be reiterated 605, as needed.

It is understood that the embodiments shown and described with respect to FIG. 6 and FIG. 7 are merely illustrative of the steps of a method of the invention, and are not intended to limit the teachings thereof. In another embodiment, the method may also comprise the step of determining an acceptable range for one or more of the system variables 110. In yet another embodiment, the method may also comprise the step of testing one or more of the system variables 110 to determine the affect on the system performance 120. Other steps are also contemplated as being within the scope of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer implemented method for enhancing performance of a computer system, comprising:
electronically deriving on the computer relationships over time between monitored system variables and monitored performance of said computer system;
automatically generating a number of rules based on said derived relationships, wherein said number of rules are generated without requiring human interaction; and
adjusting at least one of said monitored system variables based on said generated number of rules to enhance the performance of said computer system,
wherein said generating said number of rules is based at least in part on a performance goal,
wherein said deriving said relationships, said generating said number of rules, and said adjusting said at least one of said monitored system variables, are iterative;
acquiring data for said monitored system variables and the monitored performance of said computer system, wherein said acquired data is used for deriving said relationships, wherein the relationships are derived based on an analysis of the acquired data,
wherein acquiring said data comprises:
gathering said data over time; and
logging said gathered data, wherein said relationships are derived based on said logged data,
wherein said gathering said data is at discrete points in time.

2. The computer implemented method of claim 1, wherein said generating said number of rules is based at least in part on current values of said monitored system variables, and wherein said number of rules recommend incremental changes to said monitored system variables.

3. The computer implemented method of claim 1, wherein said gathering said data is in response to an event on said computer system.

4. The computer implemented method of claim 1, wherein said acquiring said data comprises acquiring at least one of the following types of data: configuration data, workload data, and performance metric data.

5. The computer implemented method of claim 1, further comprising identifying applications on said computer system having variables that affect the performance of said computer system.

6. The computer implemented method of claim 1, further comprising identifying subsystem components on said computer system having variables that affect the performance of said computer system.

* * * * *